(12) United States Patent
Miyazawa et al.

(10) Patent No.: US 7,114,395 B2
(45) Date of Patent: Oct. 3, 2006

(54) VIBRATION DETECTOR

(75) Inventors: Hiroshi Miyazawa, Tokorozawa (JP); Yoshikazu Oka, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 227 days.

(21) Appl. No.: 10/470,997

(22) PCT Filed: Feb. 8, 2002

(86) PCT No.: PCT/JP02/01087

§ 371 (c)(1),
(2), (4) Date: Aug. 1, 2003

(87) PCT Pub. No.: WO02/065812

PCT Pub. Date: Aug. 22, 2002

(65) Prior Publication Data

US 2004/0067005 A1   Apr. 8, 2004

(30) Foreign Application Priority Data

Feb. 9, 2001   (JP) ............................. 2001-034573

(51) Int. Cl.
*G01N 29/00* (2006.01)
*G02B 6/00* (2006.01)

(52) U.S. Cl. .............................. 73/655; 73/657; 385/13

(58) Field of Classification Search ................ 73/655, 73/656, 657, 653, 649; 356/433; 385/13; 250/227.16; 381/172
See application file for complete search history.

(56) References Cited

U.S. PATENT DOCUMENTS

| | | | |
|---|---|---|---|
| 3,542,536 A * | 11/1970 | Sahineller et al. ............ | 65/111 |
| 4,162,397 A | 7/1979 | Bucaro et al. | |
| 4,166,932 A | 9/1979 | Selway | |
| 4,268,116 A | 5/1981 | Schmadel et al. | |
| 4,342,907 A * | 8/1982 | Macedo et al. ........ | 250/227.14 |
| 4,443,700 A * | 4/1984 | Macedo et al. ........ | 250/227.16 |

(Continued)

FOREIGN PATENT DOCUMENTS

GB   2084719 A   *   4/1982

(Continued)

OTHER PUBLICATIONS

International Search Report, Apr. 16, 2002.

(Continued)

*Primary Examiner*—Hezron Williams
*Assistant Examiner*—Jacques saint-Surin
(74) *Attorney, Agent, or Firm*—Eric J. Robinson; Robinson Intellectual Property Law Office, P.C.

(57) ABSTRACT

A small photodetector type microphone (10) exhibiting excellent directivity without requiring any mirror surface. A diaphragm (27) vibrates in response to a sound pressure. An optical waveguide (28) is formed along the diameter of the diaphragm (27) and integral vibration of the optical waveguide (28) and the diaphragm (27) causes a variation in the quantity of light leaking from the optical waveguide (28) to the outside thus causing a variation in the quantity of light being transmitted across the optical waveguide (28). The optical waveguide (28) has one end side for introducing light into a light emitting elements (20) and the other end side for delivering light to a light receiving element (24). The light receiving element (24) outputs an electric signal related to the quantity of incident light.

7 Claims, 17 Drawing Sheets

U.S. PATENT DOCUMENTS

| | | | |
|---|---|---|---|
| 4,899,046 A * | 2/1990 | Wright et al. | 250/227.14 |
| 5,049,460 A * | 9/1991 | Benecke et al. | 430/5 |
| 5,745,611 A * | 4/1998 | Komachiya et al. | 385/13 |
| 6,018,386 A * | 1/2000 | Radun | 356/213 |
| 6,160,762 A * | 12/2000 | Luscombe et al. | 367/149 |
| 6,516,117 B1 * | 2/2003 | Fujimaki et al. | 385/37 |
| 6,612,174 B1 * | 9/2003 | Sittler et al. | 73/705 |

FOREIGN PATENT DOCUMENTS

| | | |
|---|---|---|
| JP | 58-057898 | 4/1983 |
| JP | 61-170623 | 8/1986 |
| JP | 02-107927 | 4/1990 |

OTHER PUBLICATIONS

Supplementary European Search Report dated Sep. 30, 2005 for Application No. 02711415.6.

D. Hah et al., *An Optomechanical Pressure Sensor Using Multimode Interference Couplers with Polymer Waveguides on a Thin p+ -Si Membrane*, Sensors and Actuators, Elsevier Sequoia, S.A., vol. 79, No. 3, Feb. 2000, pp. 204-210.

*Optical Microphones Mix Light and Sound*, Machine Design, vol. 66, No. 23, Dec. 12, 1994, p. 71.

* cited by examiner

VIBRATION DETECTOR

TECHNICAL FIELD

The present invention relates to a vibration detector applicable to a microphone for example, and more particularly to a vibration detector for detecting vibration by utilizing light.

BACKGROUND ART

A general microphone converts a displacement of the diaphragm vibrating in response to a sound pressure into an electric signal by using a coil or capacitor. A microphone has been proposed which is of the type that vibration of the diaphragm is converted into an electric signal by utilizing light. A known microphone of such a light use type will be described with reference to FIGS. 15 to 17. In a light detection type microphone 70 shown in FIG. 15, a diaphragm 72 mounted on the front side of a case 71 has a mirror surface on the inner side and vibrates back and forward in response to a propagating sound wave. The case 71 having a mirror surface of the inner wall has the diaphragm 72 mounted on the front opening end and receiving a sound pressure and a partition plate 75 for leaving a gap 76 between the top of the partition plate 75 and the diaphragm 72 and partitioning the inside of the case 71 excepting the gap 76 into two rooms. A light emitting element 73 and a light receiving element 74 are disposed in the partitioned rooms opposite relative to the partition plate 75. Light emitted from the light emitting element 73 is reflected at the inner mirror surface of the diaphragm 72, passes through a gap 76 and enters the light receiving element 74. A condenser lens 78 is disposed on an optical path between the light emitting element 73 and diaphragm 72 and converges light at a predetermined position of the diaphragm 72. A condenser lens 79 is disposed on an optical path between the diaphragm 72 and light receiving element 74 and converges light reflected by the diaphragm 72 at the light receiving element 74. The size of the gap 76 changes with a vibration displacement of the diaphragm 72 so that a light reception quantity of the light receiving element 74 is a function of a vibration displacement quantity of the diaphragm 72. An electric signal related to a sound pressure can thus be generated from a light reception quantity of the light receiving element 74.

FIGS. 16 and 17 are a schematic diagram and a detailed diagram showing a light detection type microphone 83 utilizing light according to another conventional technique. A monitor photodiode 85 detects a quantity of laser light irradiated from a semiconductor laser 84. A laser APC 86 controls an output of the semiconductor laser 84 in accordance with an output of the monitor photodiode 85, to thus maintain constant a radiation quantity of the semiconductor laser 84 during operation. A diaphragm 89 disposed in front of the semiconductor laser 84 has a mirror surface on the inner side and vibrates in response to a sound pressure. A laser beam from the semiconductor laser 84 passes through an objective lens 90 and becomes incident upon the diaphragm 89. The reflected light passes through the objective lens 90 and becomes incident upon a diaphragm displacement detector diode 91 which detects a light quantity. Referring to FIG. 17, each element shown in FIG. 16 excepting the diaphragm 89 is housed in a case 93. The peripheral of the diaphragm 89 is supported by the front wall of the case 93. The case 93 has a plurality of communication holes 94 for making the inner surface side of the diaphragm 89 communicate with an external. The semiconductor laser 84 and diaphragm displacement detector diode 91 are mounted on a mount substrate 96. A laser beam from the semiconductor laser 84 is irradiated to the inner mirror surface of the diaphragm 89 via a reflected light flux splitting element 97, the objective lens 90 and an achromatic transparent lid 98. The reflected light becomes incident upon the diaphragm displacement detector diode 91 via the achromatic transparent lid 98, objective lens 90 and reflected light flux splitting element 97. The achromatic transparent lid 98 prevents a sound pressure from propagating via an opening over which the lid is mounted. A focussing actuator 99 controls the position of the objective lens 90 along the axial direction by utilizing known focus servo control to be used by a compact disc (CD) player or the like. More specifically, the position of the objective lens 90 along the axial direction is controlled in accordance with the frequency components, for example, lower than 20 Hz (low frequency components lower than audible frequency) of a focus error signal detected with the diaphragm displacement detector diode 91. Regardless of vibration of the diaphragm 89, the focus of the laser beam can be positioned on the diaphragm 89. A sound pressure in the audible frequency range can be detected by deriving the focus error signal at 20 Hz or higher from the diaphragm displacement detector diode 91.

The light detection type microphone 70 shown in FIG. 15 is associated with the following problems. It is difficult to adjust the gap 76 in a sound pressure light reception region where a linear relation between a sound pressure and a light reception quantity can be obtained. A light reception quantity of the light receiving element 74 is likely to vary because of a variation in a divergence angle of light emission of the light emitting element 73 and a variation in a direction of the light emitting element 73. The light detection type microphone 83 shown in FIGS. 16 and 17 is associated with the following problems. Although a variation in the characteristics of each element and a variation in the mount position of each element can be suppressed, the layout of components becomes long along the axial direction and a compact layout is difficult. In order to improve the directivity of the microphone, it is necessary to react a sound pressure from a sound source also with the inner surface of the diaphragm 89. However, if the diaphragm 89 is positioned near at the objective lens 90 in order to make compact the light detection type microphone 83, the objective lens 90 hinders the propagation of a sound pressure to the inner surface of the diaphragm 89, resulting in a degraded directivity. It is necessary for the light detection type microphone 83 to apply a spot of a laser beam to the diaphragm 89 and detect the reflected light. It is therefore necessary to maintain always clean the inner mirror surface of the diaphragm 89. However, the inner mirror surface of the diaphragm 89 is likely to be blurred because of chemical reaction of chemical gas contained in the atmospheric air at a small quantity and because of attachment of dust.

DISCLOSURE OF THE INVENTION

An object of the invention is to provide a vibration detector capable of preventing the linearity of vibration amplitude—electric signal from being degraded by an assembly variation.

Another object of the invention is to provide a vibration detector capable of being made compact while maintaining a good directivity.

A vibration detector according to a first embodiment comprises: a diaphragm which vibrates upon reception of vibration; and an optical waveguide which extends along a direction of a flat plane of the diaphragm and equipped with the diaphragm to vibrate integrally with the diaphragm, wherein: in accordance with deformation of the optical waveguide caused by vibration of the diaphragm, a leak light quantity of light entered from one end of the optical waveguide and leaked to an outside of the optical waveguide changes and a light propagation quantity of the light propagated to the other end of the optical waveguide changes; and a displacement of the diaphragm caused by the vibration is detected by detecting a change in the light propagation quantity of the optical waveguide.

This vibration detector can be used not only as a microphone for detecting sound pressure vibration propagating in gas but also as a detector for detecting liquid pressure vibration and solid vibration propagating in liquid and solid.

In the first invention, the optical waveguide may be formed integrally with the diaphragm or adhered to the diaphragm. The vibration detector is preferably equipped with a light emitting element for irradiating light to the optical waveguide and a light receiving element for detecting a quantity of light output from the optical waveguide. The light emitting element, light receiving element and an element for processing a light reception quantity of the light reception element may be mounted outside of the vibration detector. In this vibration detector, it is not necessary to use a long layout of optical elements along the vibration direction of the diaphragm or along the optical axis direction of a lens. The vibration detector can therefore be made compact. Since a mirror surface is unnecessary, problems of contamination of the mirror surface can be eliminated. If the vibration detector is applied to a microphone, a good directivity can be obtained because an optical element such as an objective lens is not mounted near at the back surface of the diaphragm in order to make the microphone compact.

According to a vibration detector of a second invention, in the vibration detector of the first invention, in accordance with the deformation of the optical waveguide caused by vibration of the diaphragm, a material density of a deformed portion of the optical waveguide changes to thereby change a refractive index of the deformed portion; and he leak light quantity of light from the optical waveguide changes with a change in the refractive index.

In a vibration detector of a third invention, a diameter or thickness of the optical waveguide along a vibration direction of the diaphragm is set so that the leak light quantity of light from the optical waveguide changes more or less in accordance with the deformation of the optical waveguide.

The shape of a cross section of the optical waveguide may be rectangle, square, circle, ellipse or the like.

According to a vibration detector of a fourth indention, in the vibration detector of the first invention, a refractive index of the optical waveguide is set irregularly so that the leak light quantity of light from the optical waveguide changes with the deformation of the optical waveguide.

According to a vibration detector of a fifth indention, in the vibration detector of the first invention, the optical waveguide has a discontinuous region at a proper position along an extension direction of the optical waveguide; end positions of the optical waveguide confronting with each other with the discontinuous region being interposed therebetween relatively displace toward a vibration direction in response to the vibration of the diaphragm; and in accordance with the relative displacement, the leak light quantity of light from the discontinuous region of the optical waveguide changes.

According to a vibration detector of a sixth indention, in the vibration detector of the first invention, the optical waveguide is equipped in the diaphragm.

A vibration detector according to a seventh invention comprises: a diaphragm having a deflection region which deflects along a vibration direction upon reception of vibration; an optical waveguide having a deflection optical waveguide region which deflects integrally with a deflection region of the diaphragm wherein a light propagation quantity changes with deflection of the deflection optical waveguide region; a light emitting element for making light become incident upon one end of the optical waveguide; and a light receiving element for receiving light output from the other end of the optical waveguide and outputting a change in the light propagation quantity of the optical waveguide as an electric signal representative of a displacement quantity of the deflection region of the diaphragm.

According to the seventh invention, the diaphragm includes a diaphragm having a plate-like vibration member. The vibration member may be a member which vibrates upon reception of vibration propagated via air, liquid or solid, or may be a vibration source itself. In order to make the vibration member vibrate upon reception of vibration propagated via solid, the housing of the vibration detector may be fixed to the solid on the side of the vibration source so that the vibration member vibrates relative to the housing, or alternatively a predetermined vibration propagating rod may be abut upon the vibration member. The vibration detector includes at least a microphone. In the seventh invention, the element for processing an electric signal from the light receiving element may be equipped with the vibration detector or may be mounted outside of the vibration detector.

According to a vibration detector of an eighth invention, in the vibration detector of the seventh invention, the optical waveguide together with the diaphragm is held by an optical waveguide holder and optically coupled to the light emitting element and the light receiving element via the optical waveguide holder.

According to a vibration detector of a ninth invention, in the vibration detector of the seventh invention, the deflection optical waveguide region of the optical waveguide is formed continuously in an area corresponding to the deflection region of the diaphragm; in accordance with deformation of the deflection optical waveguide region caused by vibration of the diaphragm, a material density of the reflection optical waveguide region changes to thereby change a refractive index of the deflection optical waveguide region; and a leak light quantity of light from the deflection optical waveguide region changes with a change in the refractive index.

According to a vibration detector of a tenth invention, in the vibration detector of the seventh invention, the deflection optical waveguide region of the optical waveguide is formed continuously in an area corresponding to the deflection region of the diaphragm; and a diameter or thickness of the deflection optical waveguide region along a vibration direction of the diaphragm is set so that a leak light quantity of light from the deflection optical waveguide changes more or less in accordance with deformation of the deflection optical waveguide region caused by vibration of the diaphragm.

According to a vibration detector of an eleventh invention, in the vibration detector of the seventh invention, the deflection optical waveguide region of the optical waveguide is formed continuously in an area corresponding to the deflection region of the diaphragm; and a refractive index of the deflection optical waveguide region is set irregularly so that a leak light quantity of light from the deflection optical waveguide region changes with deformation of the deflection optical waveguide region.

In forming the optical waveguide, for example, thermal diffusion or ion implantation adopted by semiconductor manufacture techniques may be used. Predetermined optically transmissive material (e.g., lithium nitrate $LiNO_3$) is selectively subjected to an ion exchange process. With this ion exchange process, a refractive index of the portion ion-exchanged is changed from that of the portion not ion-exchanged so that the optical waveguide whose refractive index is not uniform can be formed. In forming the optical waveguide, for example, a plurality of metal thin films or dielectric films having different refractive indices may be pressure bonded or laminated.

According to a vibration detector of a twelfth invention, in the vibration detector of the seventh invention, the deflection optical waveguide region of the optical waveguide has a discontinuous region at a position corresponding to the deflection region of the diaphragm; end positions of the deflection optical waveguide region confronting with each other with the discontinuous region being interposed therebetween relatively displace toward a vibration direction in response to the vibration of the diaphragm; and in accordance with the relative displacement, a leak light quantity of light from the discontinuous region changes.

Upon vibration of a vibration member, opposite ends of the deflection optical waveguide region in the discontinuous region displace relatively toward the vibration direction of the vibration member. The leak light quantity of light leaking from the deflection optical waveguide region to the outside of the discontinuous region is large when the relative displacement of the opposite ends is small, and increases when it is large. In this manner, the light propagation quantity between both ends of the optical waveguide can be changed with vibration of the vibration member.

According to a vibration detector of a thirteenth invention, in the vibration detector of the seventh, eighth or twelfth invention, the diaphragm is a diaphragm having a vibration direction and a thickness direction which are coincident with each other; the deflection optical waveguide region of the optical waveguide has one discontinuous region at a position corresponding to the deflection region of the diaphragm, and one deflection optical waveguide region is provided on the side of the light emitting element of the optical waveguide relative to the discontinuous region and two deflection optical waveguide regions are provided on the side of the light receiving element; the one deflection optical waveguide region is disposed in a central area of the diaphragm along the thickness direction of the diaphragm, and the two deflection optical waveguide regions are disposed in front and back areas of the central area; end positions of each of the deflection optical waveguide regions confronting with each other with the discontinuous region being interposed therebetween relatively displace toward a vibration direction in response to vibration of the diaphragm; and in accordance with the relative displacement, a leak light quantity of light from the discontinuous region of each of the deflection optical waveguide regions changes.

Front and back surfaces of the central area of the diaphragm along the thickness direction have the relation (expansion on one surface and contraction on the other surface) that the reverse positive and negative reflections relative to vibration of the diaphragm. Therefore, by using a difference between the output light quantities of both the light receiving elements, an output having a small variation to be caused by manufacture variations of diaphragms can be obtained.

According to a vibration detector of a fourteenth invention, in the vibration detector of any one of the seventh to thirteenth invention, the diaphragm, the optical waveguide and the optical waveguide holder are integrally made of one plate of optically transmissive material.

In forming the optical waveguide from one plate of optically transmissive material, for example, thermal diffusion or ion implantation adopted by semiconductor manufacture techniques may be used. Predetermined optically transmissive material (e.g., lithium nitrate $LiNO_3$) is selectively subjected to an ion exchange process. With this ion exchange process, a refractive index of the portion ion-exchanged is changed from that of the portion not ion-exchanged.

According to a vibration detector of a fifteenth invention, in the vibration detector of the fourteenth invention, the diaphragm is formed with line-shaped through holes or grooves to improve deflection of the deflection region of the diaphragm.

The line-shaped through holes or grooves in the diaphragm are formed extending along the radiation direction and/or circumference direction of the diaphragm. Since the optically transmissive material has a relatively high rigidity, proper deflection can be obtained by forming through holes or grooves.

The discontinuous region of the optical waveguide is preferably formed at the position associated with the through hole or groove. By forming the line-shaped through hole or groove at a specific position of the diaphragm, defection of the diaphragm at the specific position can be increased. By disposing the discontinuous region of the optical waveguide at the position corresponding to the position having the increased deflection, the characteristics of the light propagation quantity between both ends of the optical waveguide can be improved relative to vibration of the diaphragm.

According to a vibration detector of a sixteenth invention, in the vibration detector of the seventh invention, the diaphragm is a diaphragm having a vibration direction and a thickness direction which are coincident with each other; the proper number of the optical waveguide holders for holding the diaphragm to the optical waveguide are disposed along a thickness direction of the diaphragm; light of the same quantity is made incident upon each of the optical waveguides from the light emitting element mounted on one end of each of the proper number of the optical waveguide holders; and the light receiving element mounted on the other end of each of the proper number of the optical waveguide holders detects a quantity of light output from each of the optical waveguides.

By processing a predetermined combination of light propagation quantities between both ends of each optical waveguide distributed along the width direction of the diaphragm, an electric signal precisely reflecting a vibration amplitude of the diaphragm can be obtained.

According to a vibration detector of a seventeenth invention, in the vibration detector of the fourteenth or fifteenth invention, the diaphragm and the optical waveguide holder are substantially circular; and the light emitting element and the light receiving element optically coupled to the optical waveguide holder are mounted on a flexible substrate which surrounds a peripheral area of the diaphragm and the optical waveguide holder.

For the interconnection between electrical wiring lines and elements on the flexible substrate, a flipchip structure is preferably used. By using the flexible substrate, optical connection between the light emitting element, light receiving element and optical waveguide and lamination assembly can be performed smoothly.

According to a vibration detector of an eighteenth invention, in the vibration detector of the fourteenth or fifteenth invention, a peripheral area of the diaphragm and the optical waveguide holder are sandwiched between ceramic layers and the light emitting element and the light receiving element optically coupled to the optical waveguide holder are embedded in a plurality of ceramic layers.

Since the diaphragm, light emitting element and light receiving element can be formed as a module, a manufacture efficiency can be improved.

EMBODIMENTS OF THE INVENTION

Embodiments of the invention will be described with reference to the accompanying drawings.

Figure 1:
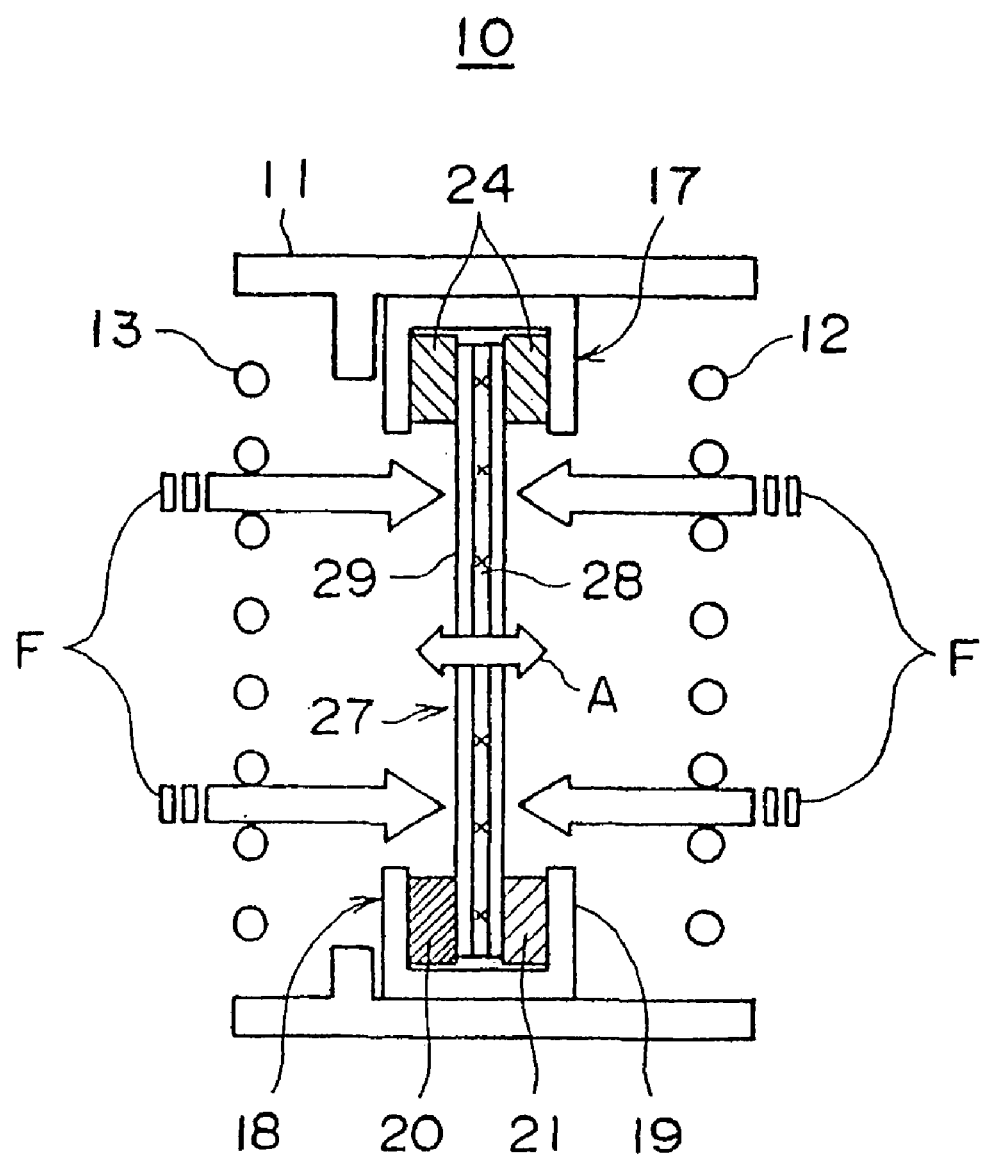
FIG. 1 is a vertical cross sectional view of a light detection type microphone.

FIG. 1 is a vertical cross sectional view of a light detection type microphone 10. A front perforated cover 12 and a back perforated cover 13 cover a front opening and a back opening of a cylindrical case 11 extending along the axial direction. The front and back perforated covers 12 and 13 prevent dust and foreign matter from entering the inside of the cylindrical case 11 and permit propagation of a sound wave into the cylindrical case 11. A circular sound pressure detector module 17 is fixed, as viewed from the front side, to approximately the central area of the cylindrical case 11 along its axial direction, and has a diaphragm 27 whose periphery is supported by a ring frame 18. In FIG. 1, F represents a sound pressure, and A represents vibration of the sound pressure detector module 17 caused by the sound pressure F. The physical values of the light detection type microphone 10 are as follows:

A length of the cylindrical case 11 along the axial direction: 10 mm or shorter;

An outer diameter of the cylindrical case 11: 10 mm or shorter;

A thickness of the diaphragm 27: 10 im or thinner; and

A total weight of the light detection type microphone: 2 g or lighter.

Figure 2:
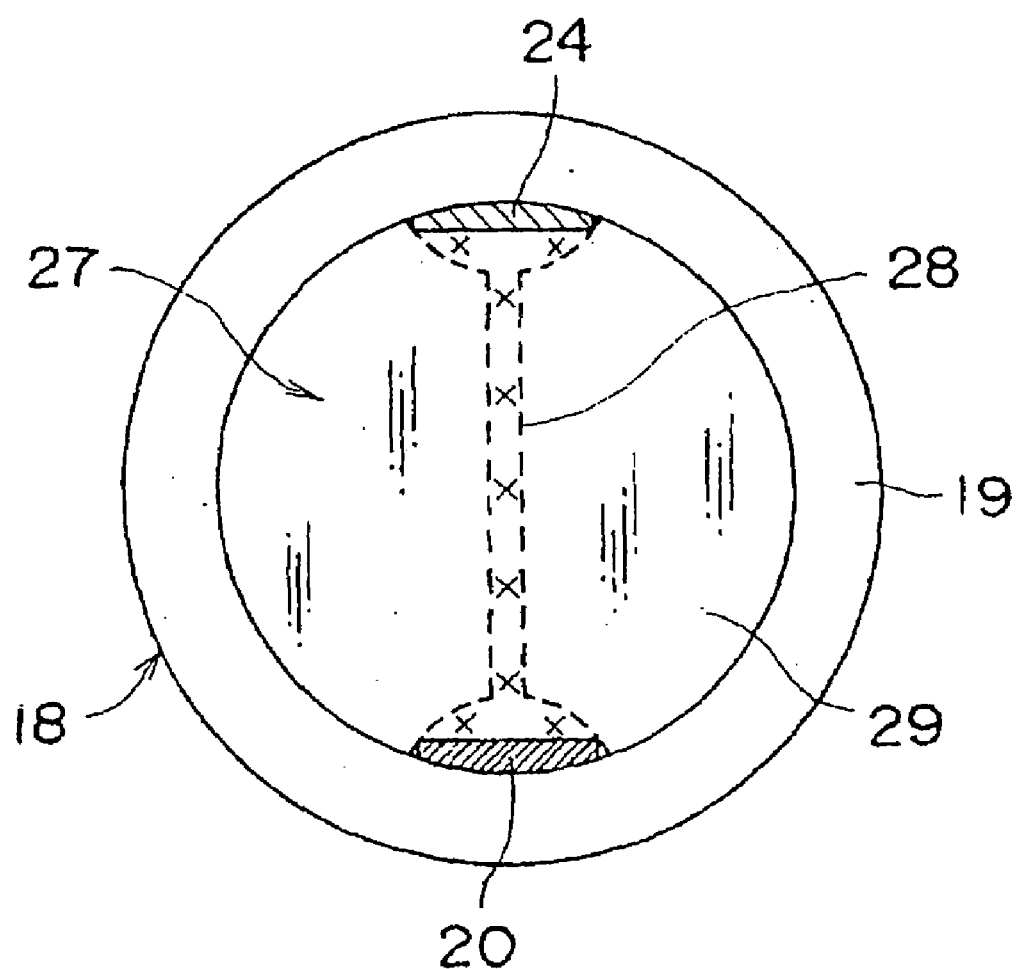
FIG. 2 is a front view of a sound pressure detector module shown in FIG. 1.

FIG. 2 is a front view of the sound pressure detector module 17. The ring frame 18 surrounds the circumference of the diaphragm 27. The diaphragm 27 is made of optically transmissive material and has an optical waveguide 28 which extends in the inside of a diaphragm main body 29 along the diameter of the diaphragm 27.

Figure 3:
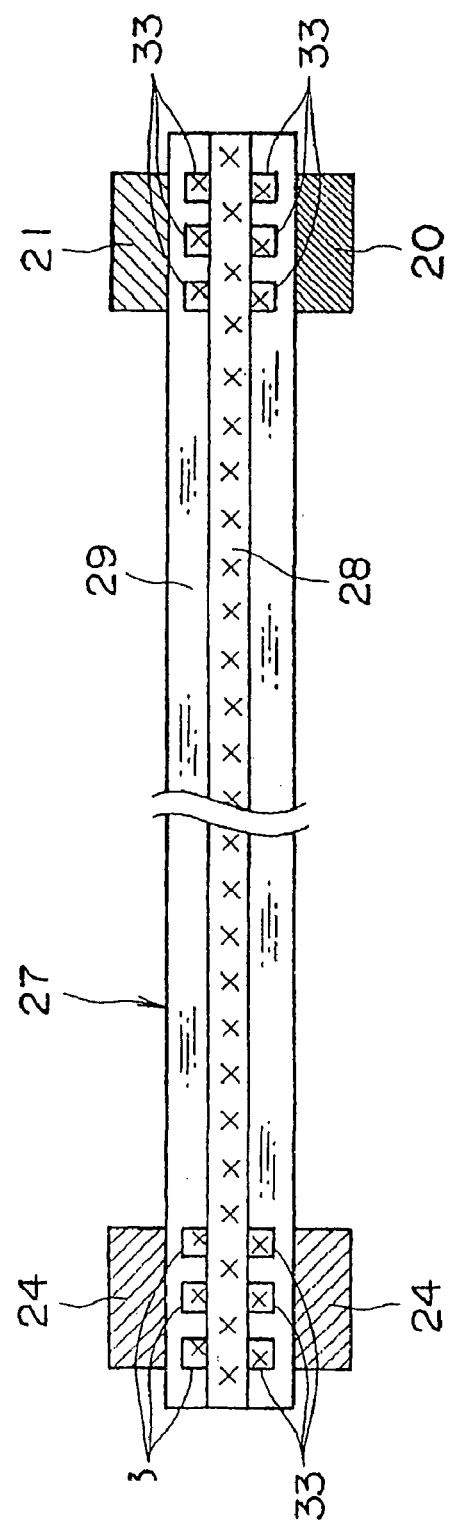
FIG. 3 is a vertical cross sectional view of a diaphragm shown in FIG. 2 and its mount structure.

FIG. 3 is a vertical cross sectional view of the diaphragm 27 shown in FIG. 2 and its mount structure. In forming the optical waveguide 28 of the diaphragm 27, by utilizing semiconductor manufacture techniques, the diaphragm (e.g., lithium nitrate $LiNO_3$) 27 is subjected to an ion exchange process by masking the portion corresponding to the optical waveguide 28. With this ion exchange process, a refractive index of the portion ion-exchanged is lowered than that of the portion not ion-exchanged which becomes the optical waveguide 28. In order that the optical waveguide 28 changes a light propagation quantity between its opposite ends in accordance with a deflection in its diameter direction or a thickness direction, i.e., a vibration direction of the diaphragm 27, in other words, in order that the optical waveguide changes a quantity of light leaked to the outside of the optical waveguide 28 in accordance with a deflection in the vibration direction of the optical waveguide 28, it is necessary to make thin the optical waveguide 28, e.g., the diameter or thickness of the optical waveguide 28 is set about a tenfold or less than the wavelength of propagation light. A light emitting element 20 and a light emission monitor 21 are fixed to both surfaces of the diaphragm 27 at one end of the optical waveguide 28. Light receiving elements 24 are fixed to both surfaces of the diaphragm 27 at the other end of the optical waveguide 28. Diffraction optical elements 33 are formed in the diaphragm 27 at opposite ends of the optical waveguide 28 by ion implantation similar to the optical waveguide 28. Incident light from the light emitting element 20 into the diaphragm 27 is guided to the optical waveguide 28 by the diffraction optical elements 33 at one end of the optical waveguide 28, and a predetermined quantity of the incident light is guided to the light emission monitor element 21. The diffraction optical elements 33 at the other end of the optical waveguide 28 make light from the optical waveguide 28 become incident upon both the light receiving elements 24.

Figure 4:
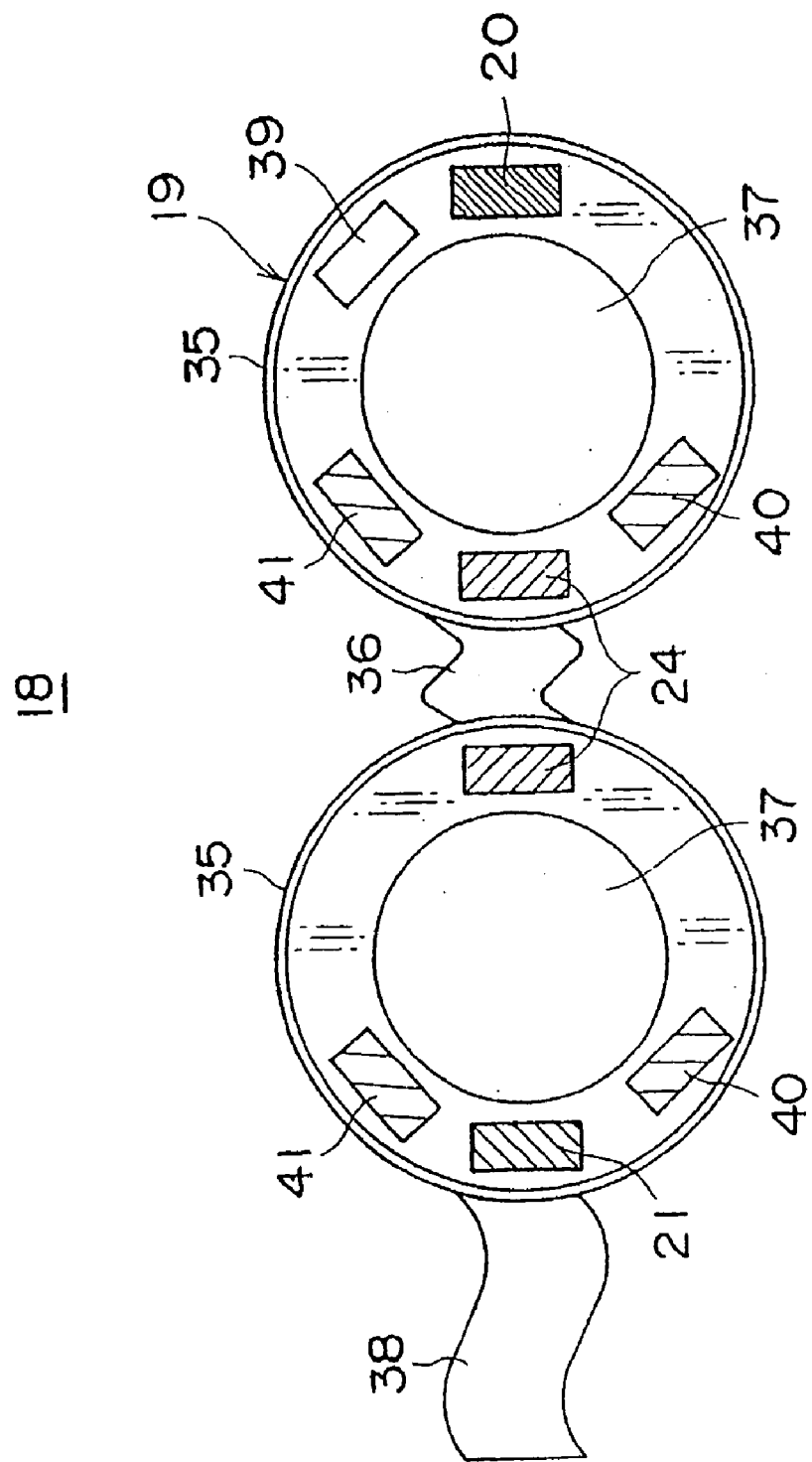
FIG. 4 is a development diagram of a ring frame shown in FIG. 2.

FIG. 4 is a development diagram of the ring frame 18 shown in FIG. 2. The ring frame 18 has a flexible substrate 19 and various electric elements mounted on the flexible substrate by a flip-chip structure. The flexible substrate 19 has: a pair of ring side plates 35 having a circular opening 37 for sandwiching the diaphragm 27; a coupling stripe 36 for electrically connecting both the ring side plates 35; and a hook band 38 coupled to one ring side plate 35 for adhering both the ring side plates 35, with the periphery of the diaphragm 27 being sandwiched between the ring side plates 35 and with the ring side plates being electrically connected. On the ring side plate 35 having the hook band 38, the light emission monitor element 21 and light receiving element 24 are mounted at opposite ends along the diameter direction. Signal processing ICs 40 and 41 are mounted near at opposite ends of the light emission monitor element 21. On the other ring side plate 35 coupled by the hook band 38, the light emitting element 20 and light receiving element 24 are mounted at opposite ends along the diameter direction. Signal processing ICs 40 and 41 are mounted near at opposite ends of the light receiving element 24. Near at the light emitting element 20, a light emission automatic adjustment IC 39 is mounted. The light emission automatic adjustment IC 39 controls a supply power to the light emitting element 20 in accordance with an output of the light emission monitor element 21 to control the light emission quantity of the light emitting element 20 to be constant. The signal processing IC 40 outputs an electric signal corresponding to a calculated value (addition value in the case of the sound pressure detector module 17) of a light reception quantity of both the light receiving elements 24. The light emitting element 20 is a semiconductor light source such as a light emitting diode (LED) and a surface radiation semiconductor laser.

Figure 5:
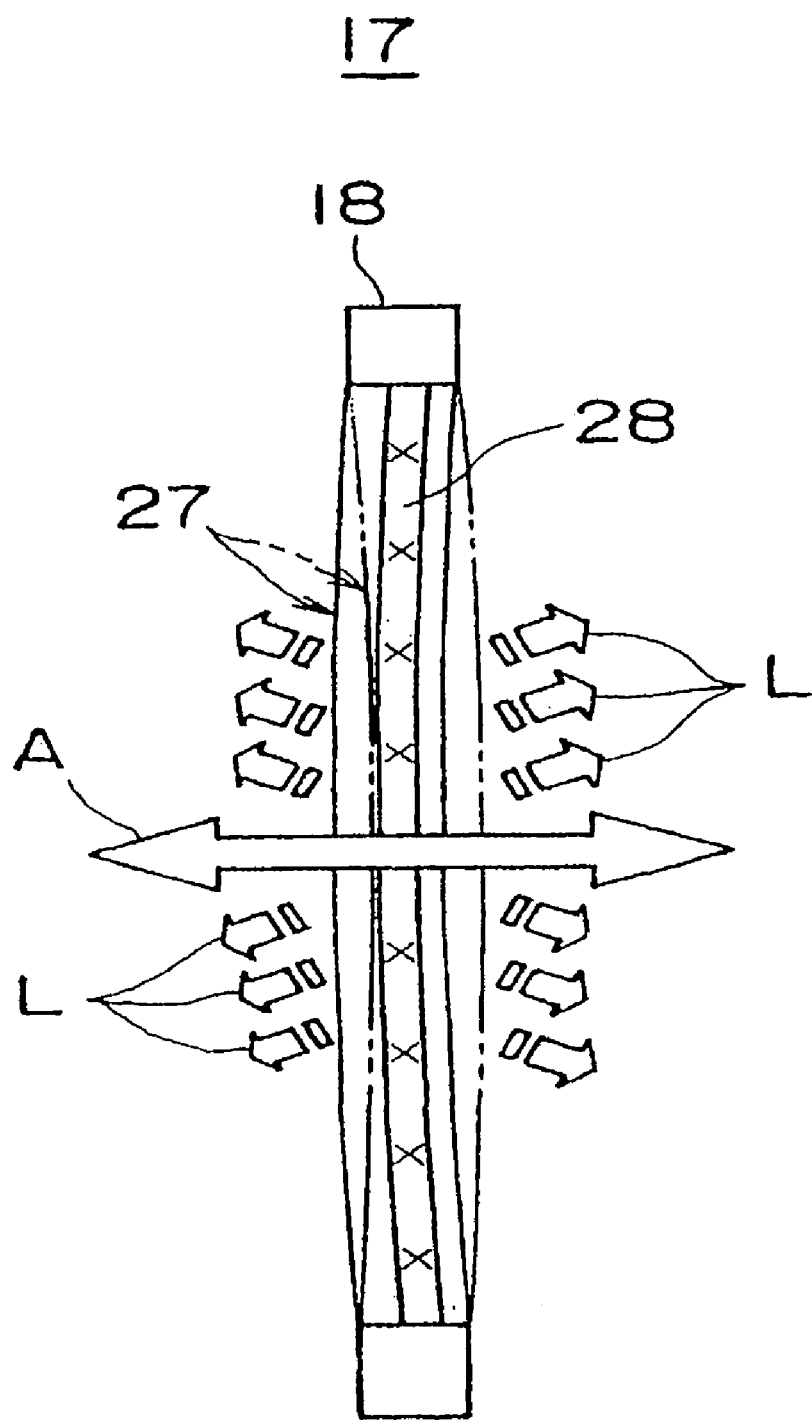
FIG. 5 is a diagram illustrating a sound pressure detection principle of a sound pressure detector module.
Figure 13:
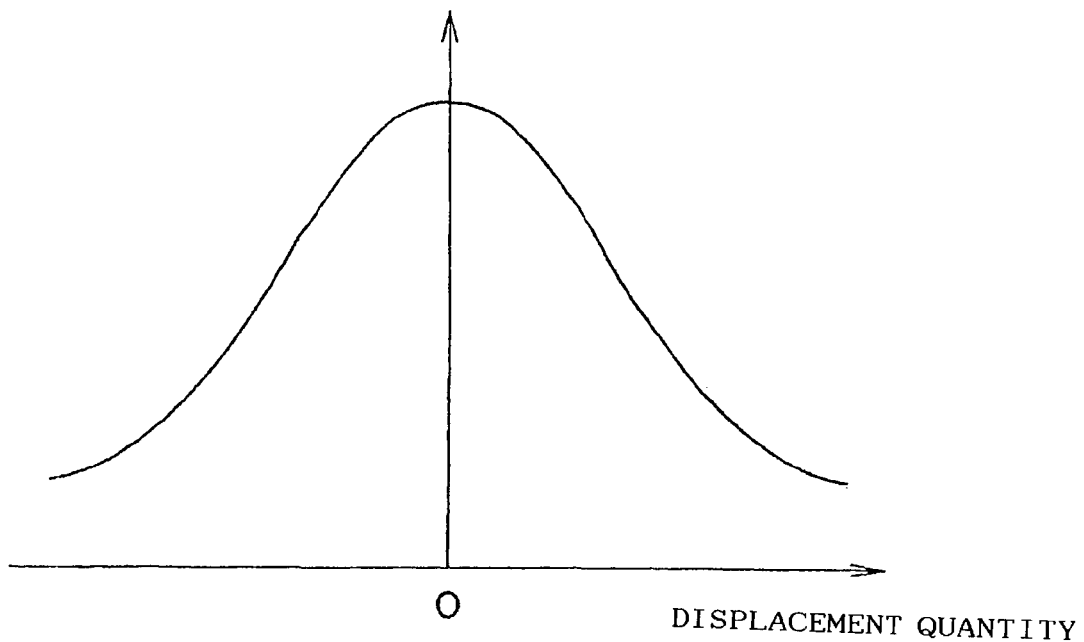
FIG. 13 is a graph showing the relation between a displacement quantity of a diaphragm along a vibration direction and a total light reception quantity of both light receiving elements.

FIG. 5 is a diagram illustrating the sound pressure detection principle of the sound pressure detector module 17. In FIG. 5, A represents a vibration direction of the diaphragm 27 caused by a sound pressure, and L represents leak light from the optical waveguide 28 caused by a deflection of the optical waveguide 28. Upon reception of a sound pressure, the diaphragm 27 vibrates in the thickness direction at an amplitude related to the sound pressure. As the diaphragm 27 vibrates, the optical waveguide 28 deflects in the diameter direction or thickness direction. A lateral deflection of the diaphragm 27 causes leak light L to propagate to the outside of the optical waveguide 28. A quantity of light leak from the optical waveguide 28 is related to a deflection quantity of the optical waveguide 28 in the diameter or thickness direction, i.e., a lateral deflection quantity and hence to a sound pressure acting upon the diaphragm 27. As a result, a total light quantity incident upon the optical waveguide 28 is related to the sound pressure. The signal processing IC 40 outputs an electric signal corresponding to the sound pressure. FIG. 13 is a graph showing the relation between a displacement quantity of the diaphragm 27 in the vibration direction and a light reception quantity of both the light receiving elements 24. The displacement quantity of the diaphragm 27 is positive in the front direction of the light detection type microphone 10.

Figure 6:
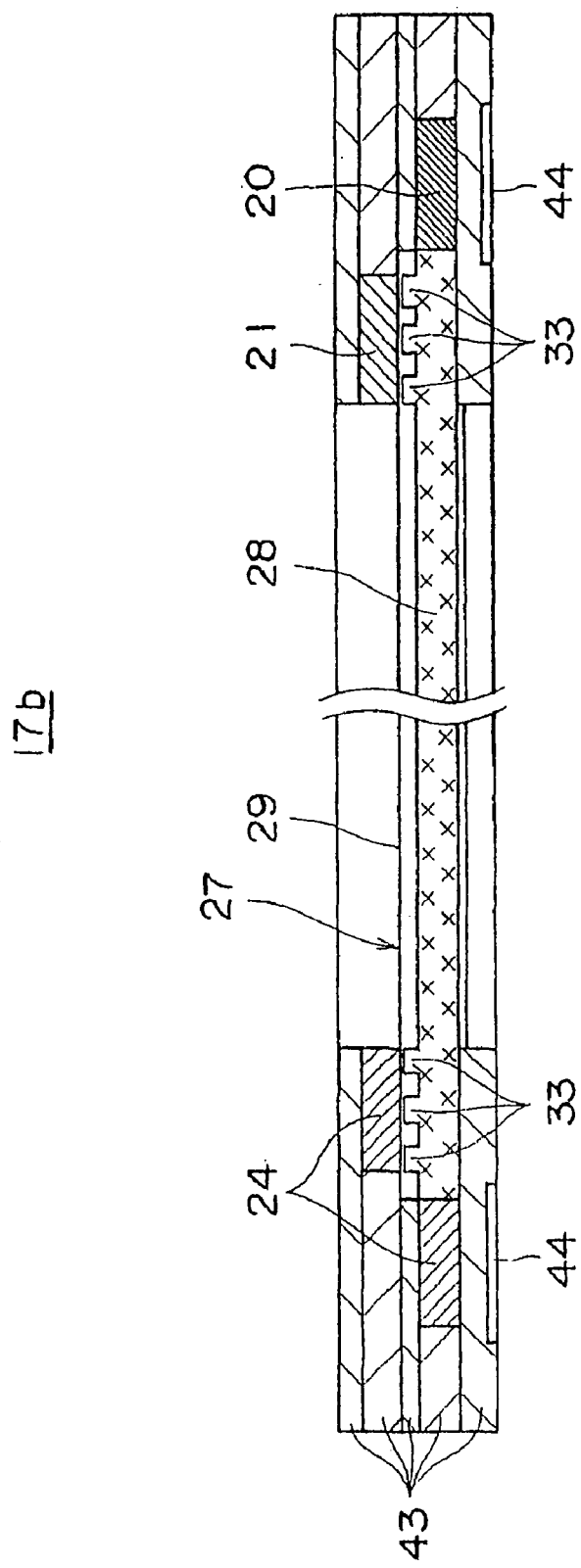
FIG. 6 is a cross sectional view of a sound pressure detector module having a ceramic layer lamination structure.

FIG. 6 is a cross sectional view of a sound pressure detector module 17*b* having a lamination structure of ceramic layers 43. Five ceramic layers 43 are stacked by exposing the diaphragm 27 except its peripheral area. A plurality of electrodes 44 are exposed on the bottom surface of the lowest ceramic layer 43. The light emitting element 20 and one light receiving element 24 are disposed in the same layer as that of the optical waveguide 28. For example, a Fabry-Perot semiconductor laser of a facet radiation type is adopted as the light emitting element 20. The diffraction optical elements 33 are formed on one side of the optical waveguide 28, only on the upper side as shown in FIG. 6.

Figure 7:
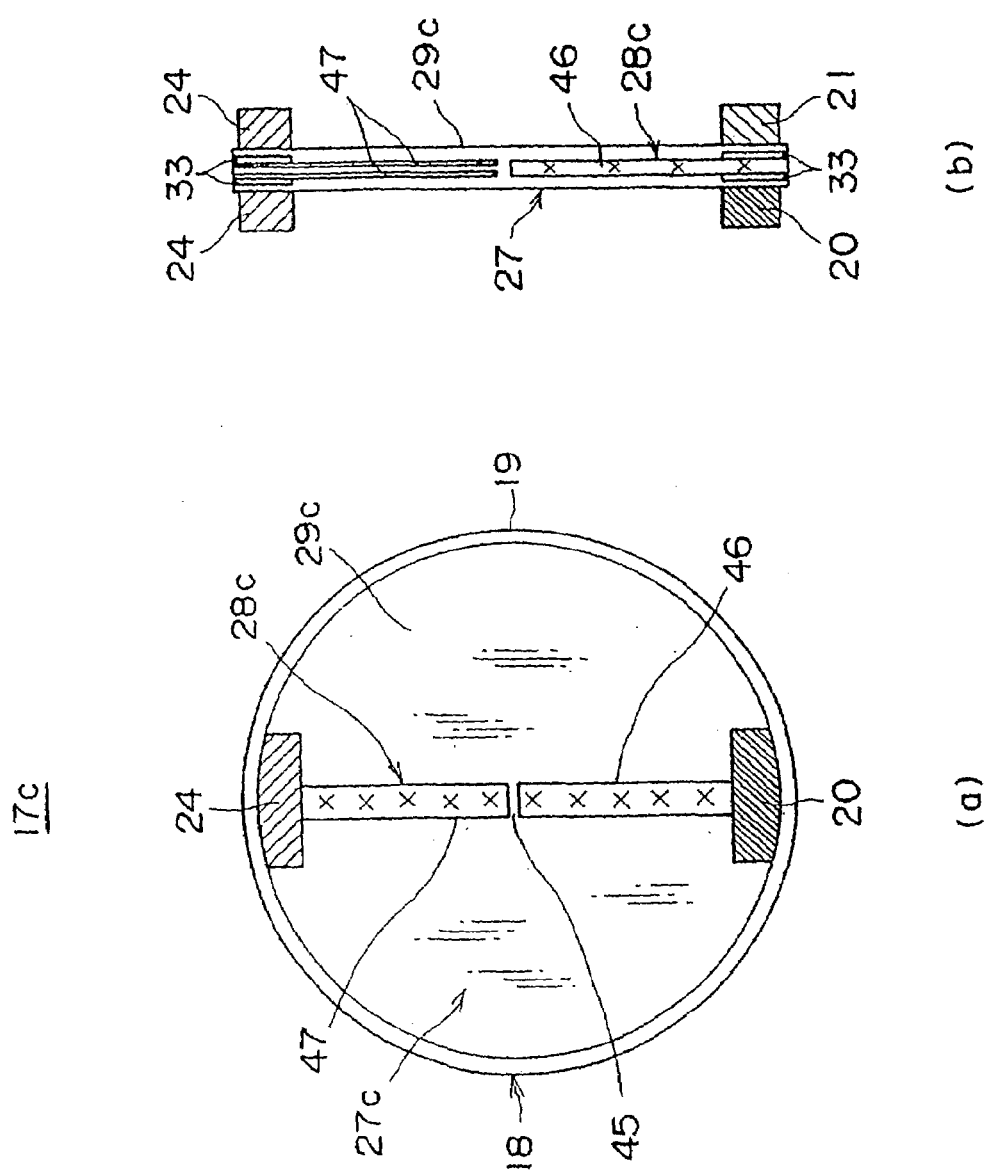
FIGS. 7(a) and 7(b) are a front view and a vertical cross sectional view showing a sound pressure detector module having an optical waveguide with another structure.

FIGS. 7(*a*) and 7(*b*) are a front view and a vertical cross sectional view of a sound pressure detector module 17*c* having an optical waveguide 28*c* with a different structure.

In FIGS. 7(*a*) and 7(*b*) showing the sound pressure detector module 17*c*, identical elements to those of the sound pressure detector module 17 shown in FIGS. 5 and 6 are represented by using the same symbols, and corresponding elements are represented by the symbol added with "c". Only the important points will be described. The optical waveguide 28*c* has a discontinuous region 45 approximately in the central area of the diaphragm 27*c*. The optical waveguide 28*c* is divided by the discontinuous region 45 into an upstream region 46 on the side of the light emitting element 20 and downstream regions 47 on the side of the light receiving element 24. There is one upstream region 46 which extends in the central area of the diaphragm 27 in the thickness direction. There are two downstream regions 47 which extend in parallel in the front and back areas of the central area of the diaphragm 27 in the thickness direction. The diameter of the upstream region 46 is larger than that of each downstream region 47. When the diaphragm 27*c* is at the balanced position (position with 0 deflection), output light propagating straightforward from the upstream region 46 is divided approximately equally and enters each downstream region 47.

Figure 8:
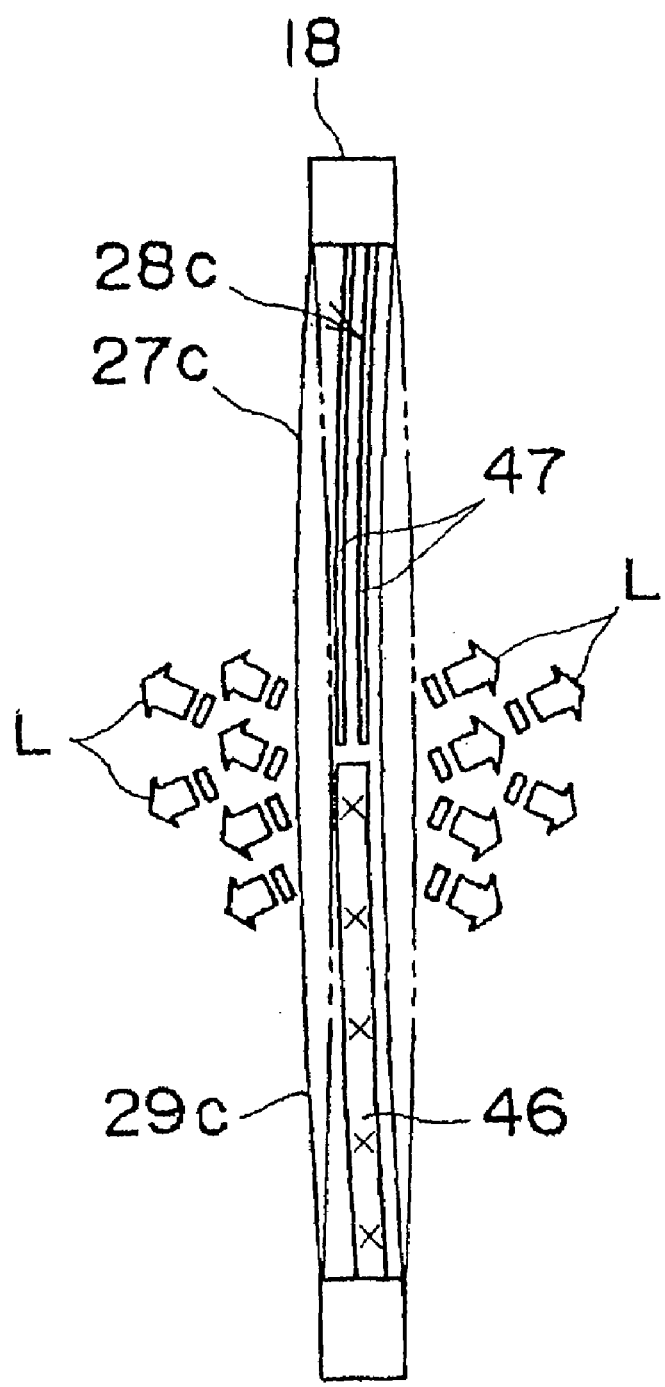
FIG. 8 is a diagram showing leak light from a discontinuous region caused by deflection of the diaphragm shown in FIG. 7.

FIG. 8 shows leak light L from the discontinuous region 45 caused by a deflection of the diaphragm 27*c* shown in FIG. 7. Referring to FIGS. 7 and 8, light from the light emitting element 20 becomes incident upon the upstream region 46 and is guided in the upstream region 46 toward the discontinuous region 45, and output from the end of the upstream region 46 on the side of the discontinuous region 45 to the discontinuous region 45. Part of the output light to the discontinuous region 45 becomes leak light L and is leaked to the outside of the diaphragm 27*c*, whereas the remaining light becomes incident upon the two downstream regions 47 and is guided in the downstream regions 47 toward the light receiving elements 24. Upon reception of a sound pressure, the diaphragm 27*c* vibrates. When the diaphragm 27*c* is at the balanced position, i.e., when a defection quantity of the diaphragm 27*c* is 0, light of the same quantity Q becomes incident upon each downstream region 47 from the upstream region 46. When the diaphragm 27*c* has a convex deflection in one direction, there is a relative shift between the upstream region 46 and each downstream region 47 of the diaphragm 27*c* in the vibration direction. Therefore, light having a quantity Q+ÄQ and light having a quantity Q−ÄQ become incident upon the downstream regions 47 from the upstream region 46. A difference between the light reception quantities of both the light receiving elements 24 is therefore 2·ÄQ relative to the sound pressure, including the case wherein the displacement quantity of the diaphragm 27*c* is 0.

Figure 14:
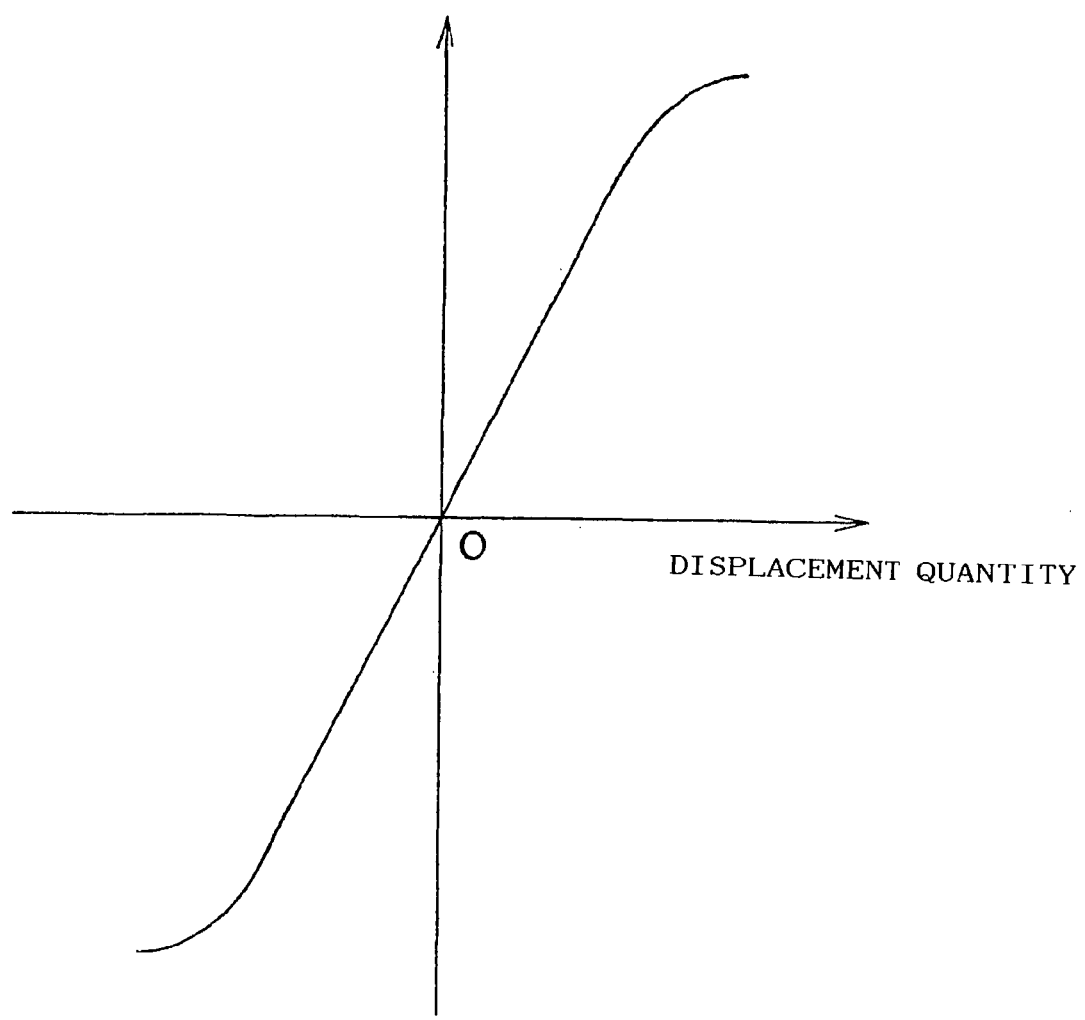
FIG. 14 is a graph showing the relation between a displacement quantity of a diaphragm of the sound pressure detector module shown in FIG. 8 and a difference between light reception quantities of both light receiving elements.
Figure 15:
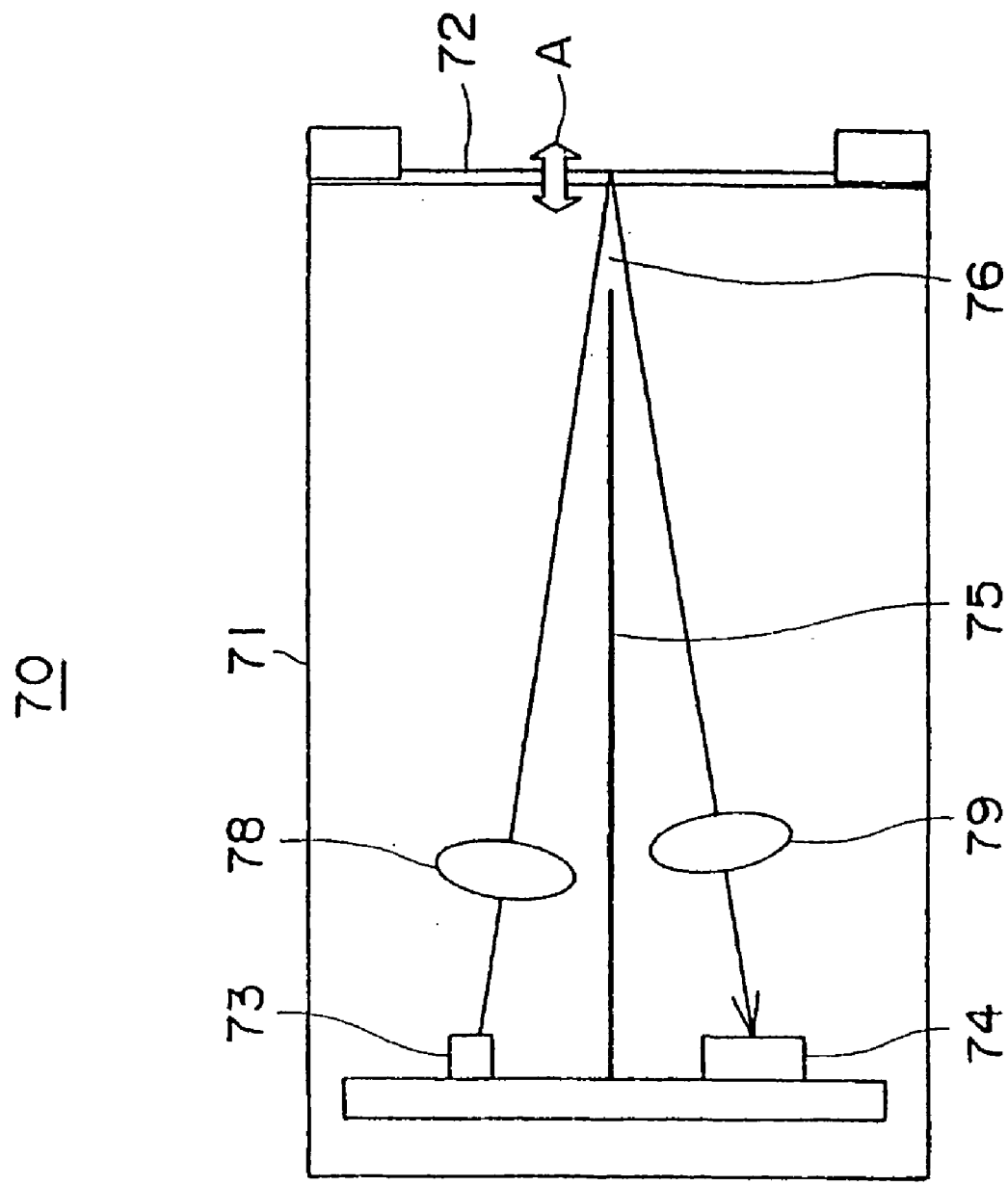
FIG. 15 is a schematic diagram showing a known light detection type microphone.
Figure 16:
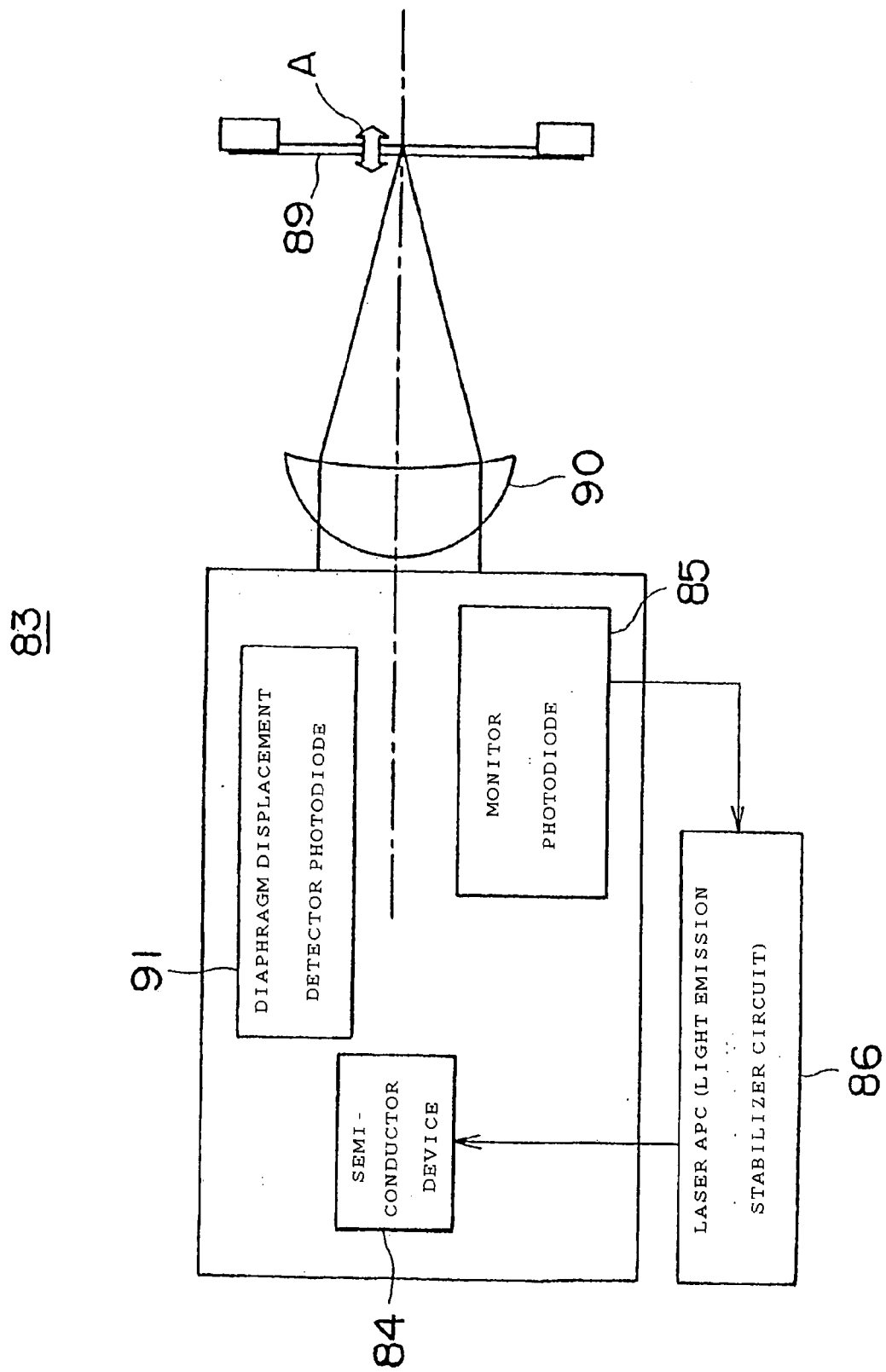
FIG. 16 is a schematic diagram showing another known light detection type microphone.
Figure 17:
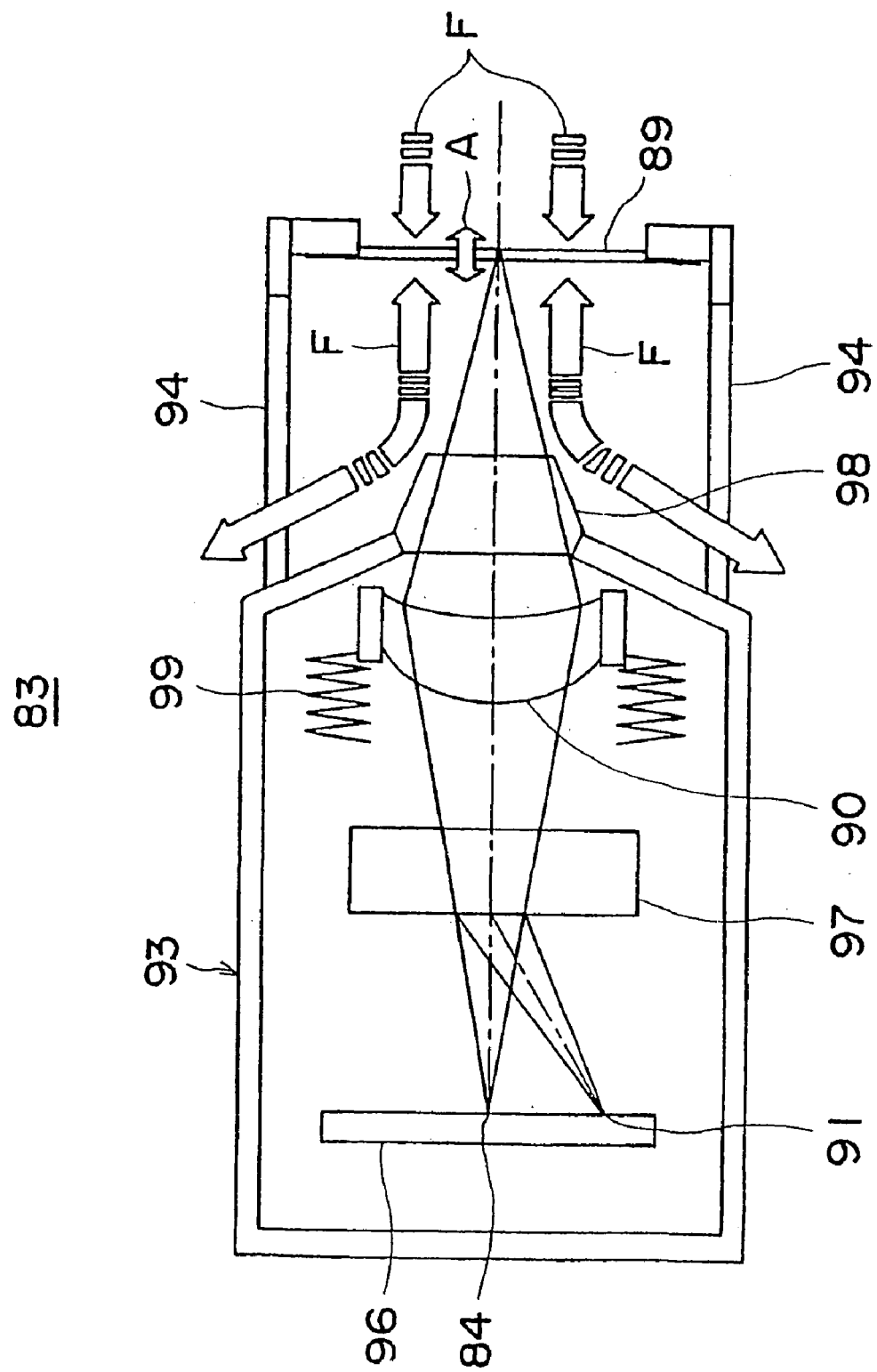
FIG. 17 is a detailed diagram of the light detection type microphone shown in FIG. 16.

FIG. 14 is a graph showing the relation between a displacement quantity of the diaphragm 27*c* of the sound pressure detector module 17*c* shown in FIG. 8 and a difference between the light reception quantities of both the light receiving elements 24. The displacement quantity of the diaphragm 27*c* is positive in the front direction of the light detection type microphone 10.

Figure 9:
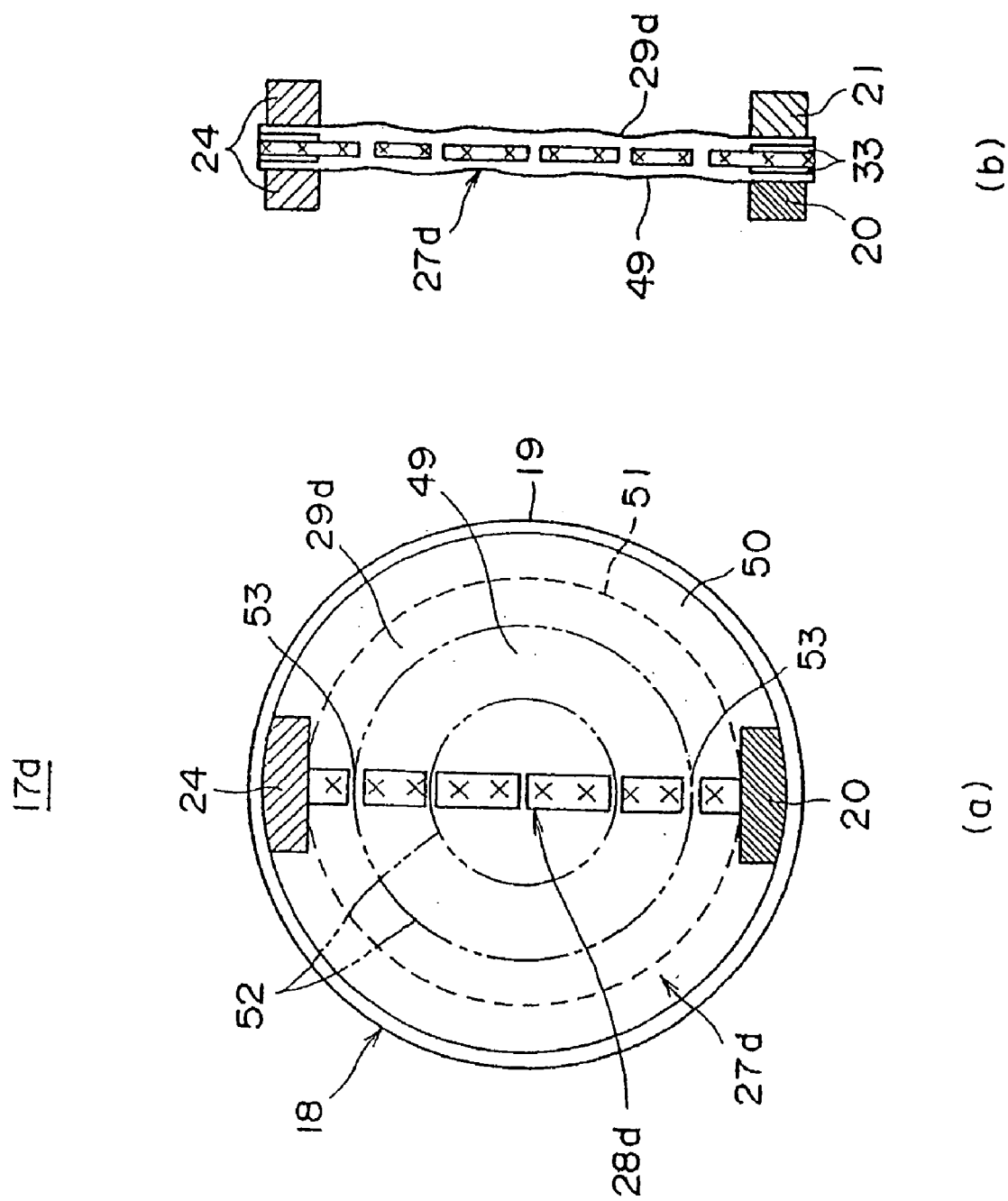
FIGS. 9(a) and 9(b) are a front view and a vertical cross sectional view showing a sound pressure detector module having a corrugated diaphragm.

FIGS. 9(*a*) and 9(*b*) are a front view and a vertical cross sectional view of a sound pressure detector module 17*d* having a corrugated diaphragm 27*d*. In FIGS. 9(*a*) and 9(*b*) showing the sound pressure detector module 17*d*, identical elements to those of the sound pressure detector modules 17 and 17*c* shown in FIGS. 5 and 8 are represented by using the same symbols, and corresponding elements are represented by the symbol added with "d". Only the important points will be described. The diaphragm 27*d* is divided at a border line 51 into an inner central corrugated thick region 49 and a flat region 50 in an outer peripheral area. On each of the front and back surfaces of the diaphragm 27d, a convex portion and a concave portion are alternately disposed in the radius direction, and the convex portion on one surface is formed at the position corresponding to that of the concave portion on the other surface in order to make uniform the thickness of the diaphragm 27d along the radius direction. Lines on the convex portions as viewed from the front side of the diaphragm 27d are represented by two border lines 52. The optical waveguide 28d has discontinuous regions 53 in the area from the outer one flat region 50 to the other flat region 50 as viewed in plan. In FIG. 9, the optical waveguide 28d has five discontinuous regions 53. The corrugated thick region 49 increases deflection of the diaphragm 27d more than the flat structure. The corrugated thick region 49 has also a function of regulating a deflection direction. By aligning the deflection direction of the diaphragm 27d with the sound pressure reception direction, a deflection quantity per sound pressure can be increased.

Figure 10:
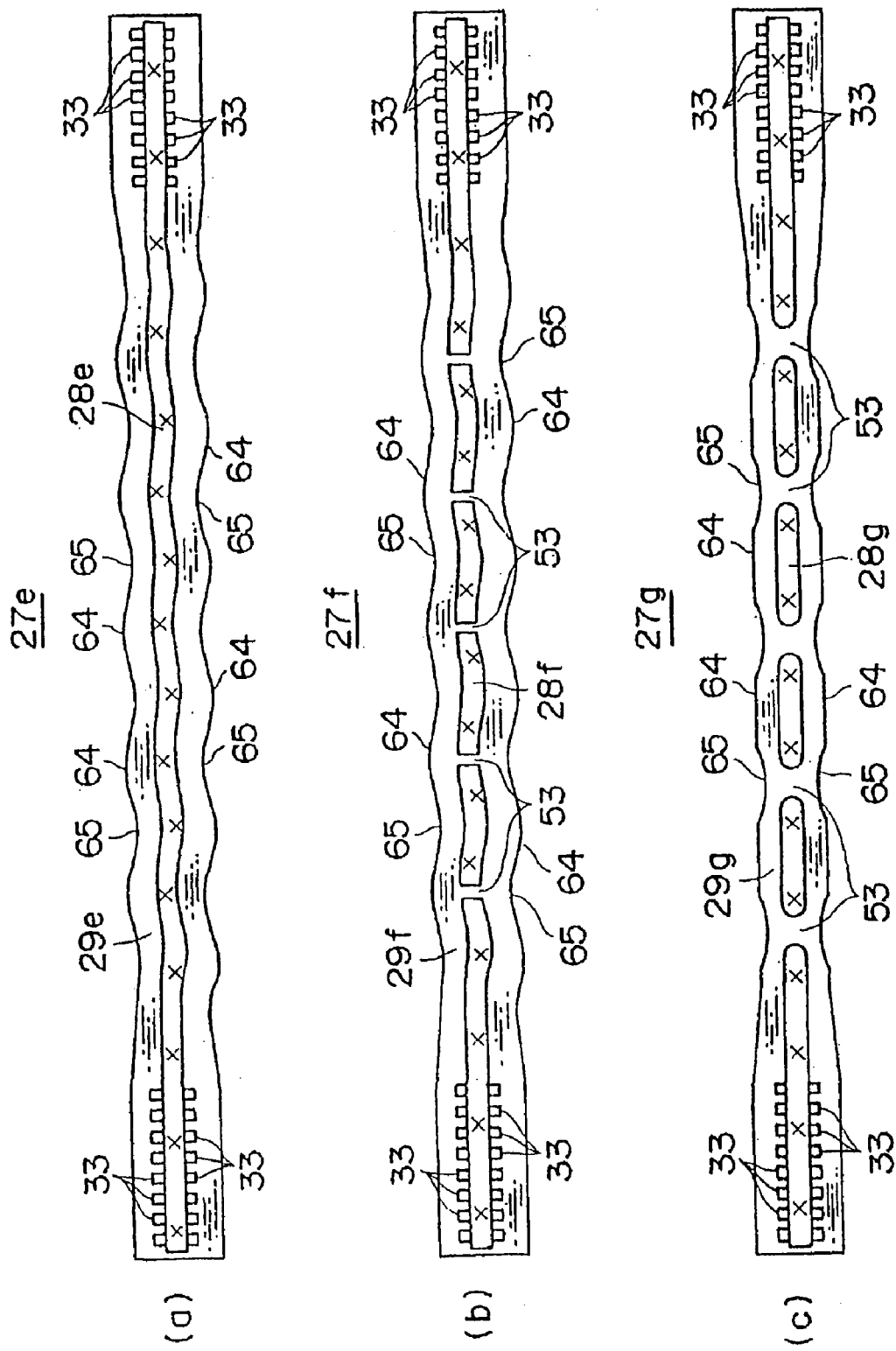
FIGS. 10(a) and 10(c) are enlarged views of corrugated diaphragms according to modifications.

FIG. 10 is enlarged views of corrugated diaphragms according to modifications. In FIGS. 10(a) to 10(c) showing the corrugated diaphragms 27e, 27f and 27g, identical elements to those of the diaphragm 27d shown in FIG. 9 are represented by using the same symbols, the description thereof is omitted, and corresponding elements are represented by changing "d" to "e", "f" or "g". On each of the front and back surfaces of the diaphragm 27d, 27f, a convex portion 64 and a concave portion 65 are alternately disposed in the radius direction, and the convex portion 64 on one surface is formed at the position corresponding to that of the concave portion 65 on the other surface at the same radius direction position in order to make uniform the thickness of the diaphragm 27e, 27f along the radius direction. The optical waveguide 28e of the diaphragm 27e shown in FIG. 10(a) and the optical waveguide 28f of the diaphragm 27f shown in FIG. 10(b) extend in the diaphragm main bodies 29e and 29f in a waving manner along the corrugated shapes of the diaphragms 28e and 28f. The optical waveguide 28e of the diaphragm 27e is continuous, whereas the optical waveguide 28f of the diaphragm 27f has a plurality of discontinuous regions 53. In order to align the phase of the diaphragm 27f during vibration, the discontinuous region 53 is formed at the position corresponding to that of the convex portion 64 on one surface at the same radius position. The diaphragm 27g shown in FIG. 10(c) is a modification of the diaphragm 27f. In this diaphragm 27g, the convex portion 64 on one surface is formed at the position corresponding to that of the convex portion 64 on the other surface, and the concave portion 65 on one surface is formed at the position corresponding to that of the concave portion 65 on the other surface, respectively at the same radius position. The rigidity of the diaphragm 27g at the radius direction position where the concave portion 65 is formed becomes lower than that at the radius direction position where the convex portion 64 is formed, so that the diaphragm is easy to be deflected. The discontinuous region 53 is formed in this area which is easy to be deflected. A quantity of leak light L caused by a vibration of the diaphragm 27g can change considerably.

Figure 11:
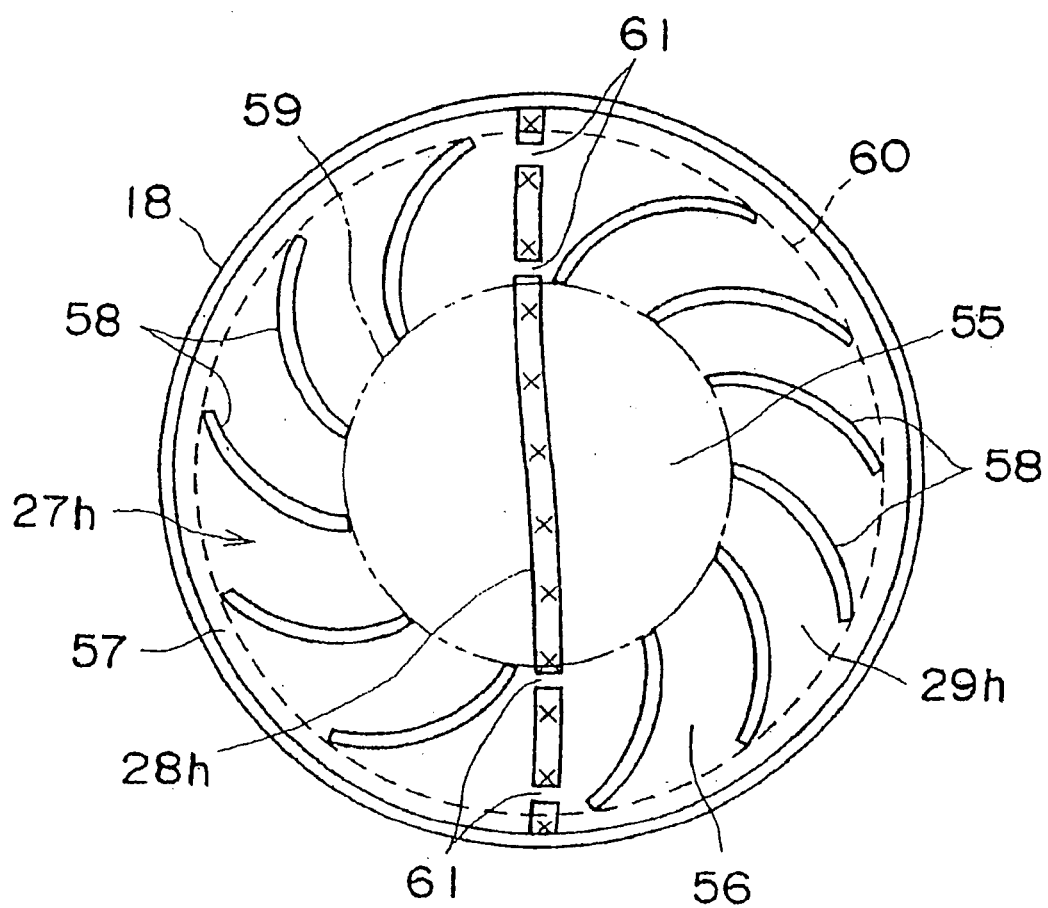
FIG. 11 is a front view of a sound pressure detector module having a diaphragm with recesses.
Figure 12:
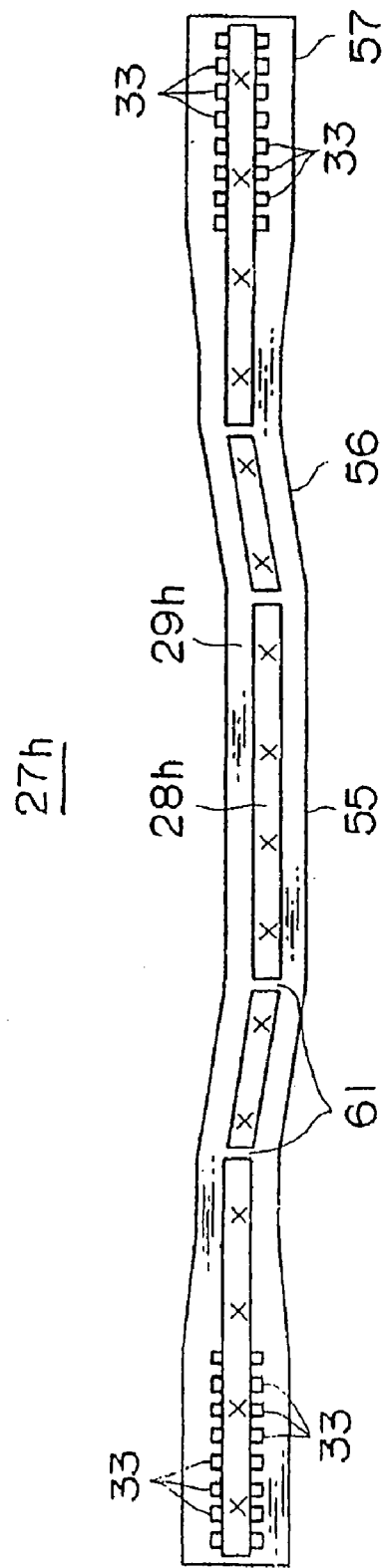
FIG. 12 is an enlarged cross sectional view of the diaphragm shown in FIG. 11.

FIG. 11 is a front view of a sound pressure detector module 17h having a diaphragm 27h with recesses 58, and FIG. 12 is an enlarged cross sectional view of the diaphragm 27h. In FIGS. 11 and 12 showing the sound pressure detector module 17h, identical elements to those of the sound pressure detector module 17 are represented by using the same symbols, and corresponding elements are represented by the symbol added with "h". Only the important points will be described. The diaphragm 27h has a circle flat region 55, a central ring region 56 and a peripheral flat region 57 in this order from the central area in the radius direction. As shown in FIG. 12, the circle flat region 55 protrudes along the axial direction of the diaphragm 27h relative to the peripheral flat region 57. The central ring region 56 extends obliquely relative to the circle flat region 55 and peripheral flat region 57. The optical waveguide 28h extends in the diaphragm main body 29h along the sectional contour line of the diaphragm 27h. A border line 59 shown in FIG. 11 indicates the border between the circle flat region 55 and central ring region 56, a border line 60 indicates the border between the central ring region 56 and peripheral flat region 57. A plurality of recesses 58 are formed through the central ring region 56 at an equal angle pitch along the circumference direction. The width of each recess 58 is exaggerated in FIG. 11 and is actually 50 im. Flection of the central ring region 56 can be increased by the recesses 58. The optical waveguide 28h has discontinuous regions 61 near at cross points with the border lines 59 and 60. There are four discontinuous regions 61 in total. Upon reception of a sound pressure, the diaphragm 27h has a largest deflection in the vibration direction at the positions corresponding to the border lines 59 and 60. By setting the discontinuous regions 61 to the positions where the largest deflection of the diaphragm 27h occurs, a change in the light propagation quantity between opposite ends of the optical waveguide 28h increases relative to a unit change quantity of a sound pressure.

What is claimed is:

1. A vibration detector comprising:
a diaphragm which vibrates upon reception of vibration; and
an optical waveguide which extends along a direction of a flat plane of said diaphragm and equipped with said diaphragm to vibrate integrally with said diaphragm, wherein:
in accordance with deformation of said optical waveguide caused by vibration of said diaphragm, a leak light quantity of light entered from one end of said optical waveguide and leaked to an outside of said optical waveguide changes and a light propagation quantity of the light propagated to the other end of said optical waveguide changes;
a displacement of said diaphragm caused by the vibration is detected by detecting a change in the light propagation quantity of said optical waveguide;
in accordance with the deformation of said optical waveguide caused by vibration of said diaphragm, a material density of a deformed portion of said optical waveguide changes to thereby change a refractive index of the deformed portion; and
the leak light quantity of light from said optical waveguide changes with a change in the refractive index,
wherein a refractive index of said optical waveguide is set irregularly so that the leak light quantity of light from said optical waveguide changes with the deformation of said optical waveguide.

2. A vibration detector comprising:
a diaphragm which vibrates upon reception of vibration; and
an optical waveguide which extends along a direction of a flat plane of said diaphragm and equipped with said diaphragm to vibrate integrally with said diaphragm, wherein:
in accordance with deformation of said optical waveguide caused by vibration of said diaphragm, a leak light quantity of light entered from one end of said optical waveguide and leaked to an outside of said optical waveguide changes and a light propagation quantity of the light propagated to the other end of said optical waveguide changes;

a displacement of said diaphragm caused by the vibration is detected by detecting a change in the light propagation quantity of said optical waveguide;

in accordance with the deformation of said optical waveguide caused by vibration of said diaphragm, a material density of a deformed portion of said optical waveguide chances to thereby change a refractive index of the deformed portion; and the leak light quantity of light from said optical waveguide changes with a change in the refractive index, wherein said optical waveguide has a discontinuous region at a proper position along an extension direction of said optical waveguide;

wherein end positions of said optical waveguide confronting with each other with said discontinuous region being interposed therebetween relatively displace toward a vibration direction in response to the vibration of said diaphragm; and wherein in accordance with the relative displacement, the leak light quantity of light from said discontinuous region of said optical waveguide changes.

3. A vibration detector comprising:

a diaphragm having a deflection region which deflects along a vibration direction upon reception of vibration;

an optical waveguide having a deflection optical waveguide region which deflects integrally with a deflection region of said diaphragm wherein a light propagation quantity changes with deflection of the deflection optical waveguide region;

a light emitting element for making light become incident upon one end of said optical waveguide;

a light receiving element for receiving light output from the other end of said optical waveguide and outputting a change in the light propagation quantity of said optical waveguide as an electric signal representative of a displacement quantity of the deflection region of said diaphragm;

said deflection optical waveguide region of said optical waveguide is formed continuously in an area corresponding to the deflection region of said diaphragm;

in accordance with deformation of said deflection optical waveguide region caused by vibration of said diaphragm, a material density of said reflection optical waveguide region changes to thereby change a refractive index of said deflection optical waveguide region; and a leak light quantity of light from said deflection optical waveguide region changes with a change in the refractive index, wherein said deflection optical waveguide region of said optical waveguide is formed continuously in an area corresponding to the deflection region of said diaphragm; and wherein a refractive index of said deflection optical waveguide region is set irregularly so that a leak light quantity of light from said deflection optical waveguide region changes with deformation of said deflection optical waveguide region.

4. A vibration detector comprising:

a diaphragm having a deflection region which deflects along a vibration direction upon reception of vibration;

an optical waveguide having a deflection optical waveguide region which deflects integrally with a deflection region of said diaphragm wherein a light propagation quantity changes with deflection of the deflection optical waveguide region;

a light emitting element for making light become incident upon one end of said optical waveguide;

a light receiving element for receiving light output from the other end of said optical waveguide and outputting a chance in the light propagation quantity of said optical waveguide as an electric signal representative of a displacement quantity of the deflection region of said diaphragm;

said deflection optical waveguide region of said optical waveguide is formed continuously in an area corresponding to the deflection region of said diaphragm;

in accordance with deformation of said deflection optical waveguide region caused by vibration of said diaphragm, a material density of said reflection optical waveguide region changes to thereby change a refractive index of said deflection optical waveguide region; and a leak light quantity of light from said deflection optical waveguide region changes with a change in the refractive index, wherein said deflection optical waveguide region of said optical waveguide has a discontinuous region at a position corresponding to the deflection region of said diaphragm;

wherein end positions of said deflection optical waveguide region confronting with each other with said discontinuous region being interposed therebetween relatively displace toward a vibration direction in response to the vibration of said diaphragm; and wherein in accordance with the relative displacement, a leak light quantity of light from said discontinuous region changes.

5. A vibration detector comprising:

a diaphragm having a deflection region which deflects along a vibration direction upon reception of vibration;

an optical waveguide having a deflection optical waveguide region which deflects integrally with a deflection region of said diaphragm wherein a light propagation quantity changes with deflection of the deflection optical waveguide region;

a light emitting element for making light become incident upon one end of said optical waveguide;

a light receiving element for receiving light output from the other end of said optical waveguide and outputting a chance in the light propagation quantity of said optical waveguide as an electric signal representative of a displacement quantity of the deflection region of said diaphragm;

said deflection optical waveguide region of said optical waveguide is formed continuously in an area corresponding to the deflection region of said diaphragm;

in accordance with deformation of said deflection optical waveguide region caused by vibration of said diaphragm, a material density of said reflection optical waveguide region changes to thereby chance a refractive index of said deflection optical waveguide region; and a leak light quantity of light from said deflection optical waveguide region changes with a change in the refractive index, wherein said diaphragm is a diaphragm having a vibration direction and a thickness direction which are coincident with each other;

wherein said deflection optical waveguide region of said optical waveguide has one discontinuous region at a position corresponding to the deflection region of said diaphragm, and one deflection optical waveguide region is provided on the side of said light emitting element of said optical waveguide relative to said discontinuous region and two deflection optical waveguide regions are provided on the side of said light receiving element;

wherein said one deflection optical waveguide region is disposed in a central area of said diaphragm along the thickness direction of said diaphragm, and said two deflection optical waveguide regions are disposed in front and back areas of the central area;

wherein end positions of each of said deflection optical waveguide regions confronting with each other with said discontinuous region being interposed therebetween relatively displace toward a vibration direction in response to vibration of said diaphragm; and wherein in accordance with the relative displacement, a leak light quantity of light from said discontinuous region of each of said deflection optical waveguide regions changes.

6. A vibration detector comprising:

a diaphragm having a deflection region which deflects along a vibration direction upon reception of vibration;

an optical waveguide having a deflection optical waveguide region which deflects integrally with a deflection region of said diaphragm wherein a light propagation quantity changes with deflection of the deflection optical waveguide region;

a light emitting element for making light become incident upon one end of said optical waveguide;

a light receiving element for receiving light output from the other end of said optical waveguide and outputting a change in the light propagation quantity of said optical waveguide as an electric signal representative of a displacement quantity of the deflection region of said diaphragm;

said deflection optical waveguide region of said optical waveguide is formed continuously in an area corresponding to the deflection region of said diaphragm;

in accordance with deformation of said deflection optical waveguide region caused by vibration of said diaphragm, a material density of said reflection optical waveguide region changes to thereby change a refractive index of said deflection optical waveguide region; and a leak light quantity of light from said deflection optical waveguide region changes with a change in the refractive index, wherein said diaphragm is a diaphragm having a vibration direction and a thickness direction which are coincident with each other;

wherein the proper number of the optical waveguide holders for holding said diaphragm to said optical waveguide are disposed along a thickness direction of said diaphragm;

wherein light of the same quantity is made incident upon each of said optical waveguides from said light emitting element mounted on one end of each of the proper number of the optical waveguide holders; and wherein said light receiving element mounted on the other end of each of the proper number of the optical waveguide holders detects a quantity of light output from each of said optical waveguides.

7. A vibration detector comprising:

a diaphragm having a deflection region which deflects along a vibration direction upon reception of vibration;

an optical waveguide having a deflection optical waveguide region which deflects integrally with a deflection region of said diaphragm wherein a light propagation quantity changes with deflection of the deflection optical waveguide region;

a light emitting element for making light become incident upon one end of said optical waveguide;

a light receiving element for receiving light output from the other end of said optical waveguide and outputting a change in the light propagation quantity of said optical waveguide as an electric signal representative of a displacement quantity of the deflection region of said diaphragm;

said deflection optical waveguide region of said optical waveguide is formed continuously in an area corresponding to the deflection region of said diaphragm;

in accordance with deformation of said deflection optical waveguide region caused by vibration of said diaphragm, a material density of said reflection optical waveguide region changes to thereby chance a refractive index of said deflection optical waveguide region; and a leak light quantity of light from said deflection optical waveguide region changes with a change in the refractive index, wherein said diaphragm is formed with line-shaped through holes or grooves to improve deflection of the deflection region of said diaphragm, and wherein a peripheral area of said diaphragm and the optical waveguide holder are sandwiched between ceramic layers and said light emitting element and said light receiving element optically coupled to the optical waveguide holder are embedded in a plurality of ceramic layers.

* * * * *